(12) United States Patent
Dirnberger

(10) Patent No.: US 12,270,165 B2
(45) Date of Patent: Apr. 8, 2025

(54) SOUND ABSORBER

(71) Applicant: Sealed Air Verpackungen GmbH, Alsfeld (DE)

(72) Inventor: Ralf Dirnberger, Oberndorf bei Salzburg (AT)

(73) Assignee: Sealed Air Verpackungen GmbH, Alsfeld (DE)

( * ) Notice: Subject to any disclaimer, the term of this patent is extended or adjusted under 35 U.S.C. 154(b) by 275 days.

(21) Appl. No.: 17/763,402

(22) PCT Filed: Oct. 1, 2020

(86) PCT No.: PCT/EP2020/077574
§ 371 (c)(1),
(2) Date: Mar. 24, 2022

(87) PCT Pub. No.: WO2021/064129
PCT Pub. Date: Apr. 8, 2021

(65) Prior Publication Data
US 2022/0341107 A1  Oct. 27, 2022

(30) Foreign Application Priority Data

Oct. 1, 2019  (AT) .............................. A 50833/2019

(51) Int. Cl.
*E01F 8/00* (2006.01)
*E01B 19/00* (2006.01)
(Continued)

(52) U.S. Cl.
CPC .......... *E01F 8/0017* (2013.01); *E01F 8/0047* (2013.01); *G10K 11/162* (2013.01)

(58) Field of Classification Search
CPC ......... E01F 8/00; E01F 8/0017; E01F 8/0005; E01F 8/0029; E01F 8/0047; E01F 8/0094;
(Continued)

(56) References Cited

U.S. PATENT DOCUMENTS 1,554,179 A * 9/1925 Wilbur ...................... E04B 1/86
D25/155
1,554,180 A * 9/1925 Trader .................. E04B 1/8409
312/7.1
(Continued)

FOREIGN PATENT DOCUMENTS

AT           8539 U2     9/2006
CN       104196142 A    12/2014
(Continued)

OTHER PUBLICATIONS

Zadeh et al., A Review on Concrete Recycling, World J. Advanced Research and Reviews, 19(02):784-793 (Aug. 14, 2023).

*Primary Examiner* — Edgardo San Martin
(74) *Attorney, Agent, or Firm* — Daniel B. Ruble

(57) ABSTRACT

The invention relates to a sound absorber (1) for a traffic route noise protection wall, wherein the sound absorber (1) comprises at least one plastic foam board (2). According to the invention, a first surface (3) of the plastic foam board (2) has a predeterminable number of sound absorber recesses (4) for predetermination of the absorption behavior with a predeterminable frequency response, wherein each of the sound absorber recesses (4) extends only through part of the thickness (5) of the plastic foam board (2).

20 Claims, 1 Drawing Sheet

(51) Int. Cl.
*E04B 1/84* (2006.01)
*G10K 11/162* (2006.01)

(58) Field of Classification Search
CPC ...... E04B 1/86; E04B 1/84; E04B 2001/8485; E04B 2001/848; E04B 2001/8476; E04B 2001/8457; G10K 11/162; G10K 11/172; E01B 19/00; E01B 19/003
See application file for complete search history.

(56) References Cited

U.S. PATENT DOCUMENTS

| | | | | |
|---|---|---|---|---|
| 1,804,884 | A | * | 5/1931 | Mazer ................ E04B 1/86 |
| | | | | D25/163 |
| 1,825,770 | A | * | 10/1931 | Barnett ............... E04B 1/86 |
| | | | | 181/293 |
| 1,875,074 | A | * | 8/1932 | Mason ................ E04B 1/86 |
| | | | | 428/167 |
| 3,035,657 | A | * | 5/1962 | Cecil ................. E04B 9/0457 |
| | | | | D25/138 |
| 3,087,577 | A | * | 4/1963 | Prestia ............... E04B 9/0464 |
| | | | | 52/316 |
| 3,593,819 | A | * | 7/1971 | Giraudeau ......... E04B 1/8409 |
| | | | | 181/288 |
| 4,160,491 | A | * | 7/1979 | Matsumoto ......... C04B 28/02 |
| | | | | 181/294 |
| 5,457,291 | A | * | 10/1995 | Richardson ......... G10K 11/172 |
| | | | | 181/294 |
| 5,962,107 | A | * | 10/1999 | Lowery .............. G10K 11/16 |
| | | | | 428/156 |
| 6,207,254 | B1 | * | 3/2001 | Lee .................. B29C 44/5609 |
| | | | | 428/316.6 |
| 6,720,069 | B1 | * | 4/2004 | Murakami .......... G10K 11/16 |
| | | | | 428/218 |
| 7,721,847 | B2 | * | 5/2010 | Coury ................ E04B 9/045 |
| | | | | 181/293 |
| 9,343,059 | B2 | * | 5/2016 | Wilson .............. G10K 11/172 |
| 10,900,222 | B2 | * | 1/2021 | Smith ................ E04B 1/86 |
| 2015/0090526 | A1 | * | 4/2015 | Sasaki .............. G10K 11/16 |
| | | | | 181/294 |

FOREIGN PATENT DOCUMENTS

| | | | | |
|---|---|---|---|---|
| CN | 106801387 | A | * | 6/2017 |
| DE | 7824873 | U1 | | 4/1980 |
| DE | 202019000914 | U1 | * | 5/2019 |
| EP | 0945547 | B1 | | 1/2005 |
| EP | 2458090 | A2 | | 5/2012 |
| JP | 2531982 | B2 | * | 9/1996 |
| JP | H09328833 | A | * | 12/1997 |
| JP | 2009264102 | A | | 11/2009 |
| JP | 4585917 | B2 | * | 11/2010 |
| KR | 20040093963 | A | * | 11/2004 |
| KR | 101192879 | B1 | | 10/2012 |
| KR | 20150107192 | A | * | 9/2015 |
| KR | 20160012840 | A | | 2/2016 |
| WO | 09949134 | A1 | | 9/1999 |
| WO | 2012156416 | A1 | | 11/2012 |
| WO | 2013010217 | A1 | | 1/2013 |
| WO | WO-2019026294 | A1 | * | 2/2019 |
| WO | 2019177694 | A1 | | 9/2019 |

\* cited by examiner

SOUND ABSORBER

The present invention is directed to a sound absorber according to the preamble of claim 1.

BACKGROUND

Sound absorbers for outdoor use are known. These are usually placed along traffic routes, such as busy roads and/or railway tracks, in order to reduce noise pollution in the surrounding environment.

In contrast to sound absorbers for indoors use, such sound absorbers for outdoor use must be weather-resistant to a certain extent. Outdoor sound absorbers must be insensitive to moisture and dirt. Furthermore, these outdoor sound absorbers should ensure noise protection or noise reduction over a long period of time. Due to this requirement many concepts utilized in indoor areas are out of the question for outdoor use because indoor sound absorbers usually have cavities which, under outdoor conditions, are quickly populated by birds or insects depending on their size, or are simply clogged with leaves or other objects, and as a result lose their effectiveness. Furthermore, weather influences, such as by rain, snow and ice, can have a negative impact on the effectiveness of such indoor concepts.

Plastic foam boards are known which have good resistance to the effects of weather, and which, even when exposed to outdoor conditions for a sufficiently long period of time, remain chemically stable. These plastic foam boards have an essentially closed surface, and as a result they do not provide possibilities for birds or insects for hiding or nesting therein. In addition they are insensitive to ice and erosion.

On the other hand, a disadvantage of such plastic foam boards is their relatively low sound absorption capacity.

SUMMARY

Therefore, it is an object of the present invention to specify a sound absorber of the type mentioned at the outset such that the sound absorber avoids the disadvantages mentioned, and is weather-resistant and has a high sound-absorbing capacity, wherein the sound absorption capacity may be easily adapted to different requirements.

A sound absorber for a traffic route noise protection wall includes at least one plastic foam board. The plastic foam board has a given thickness and a first surface forming a surface of the sound absorber. The plastic foam board defines sound absorber recesses in the form of a plurality of grooves extending across the first surface. The plurality of grooves provide a desired frequency response sound absorption capacity behavior for the foam board. The sound absorber recesses extend only partially into the thickness of the plastic foam board.

In this way a weather-resistant sound absorber can be realized which, because of the sound absorber recesses or openings in its surface, provides a high sound absorption capacity. It has been found that the number as well as the specific dimensions and shapes of the sound absorber recesses determine both the degree of the sound absorption capacity as well as the frequency dependence or frequency response of the sound absorption capacity. By predetermining or adapting the sound absorber recesses the sound absorption capacity can therefore be easily adapted to different requirements.

The dependent claims relate to further advantageous embodiments of the invention.

Express reference is hereby made to the wording of the claims, whereby the claims are incorporated here by reference and are deemed to be reproduced here verbatim.

BRIEF DESCRIPTION OF THE DRAWINGS

The present invention is described in more detail with reference to the accompanying drawings which show preferred embodiments, and in which.

DETAILED DESCRIPTION

Figure 1:
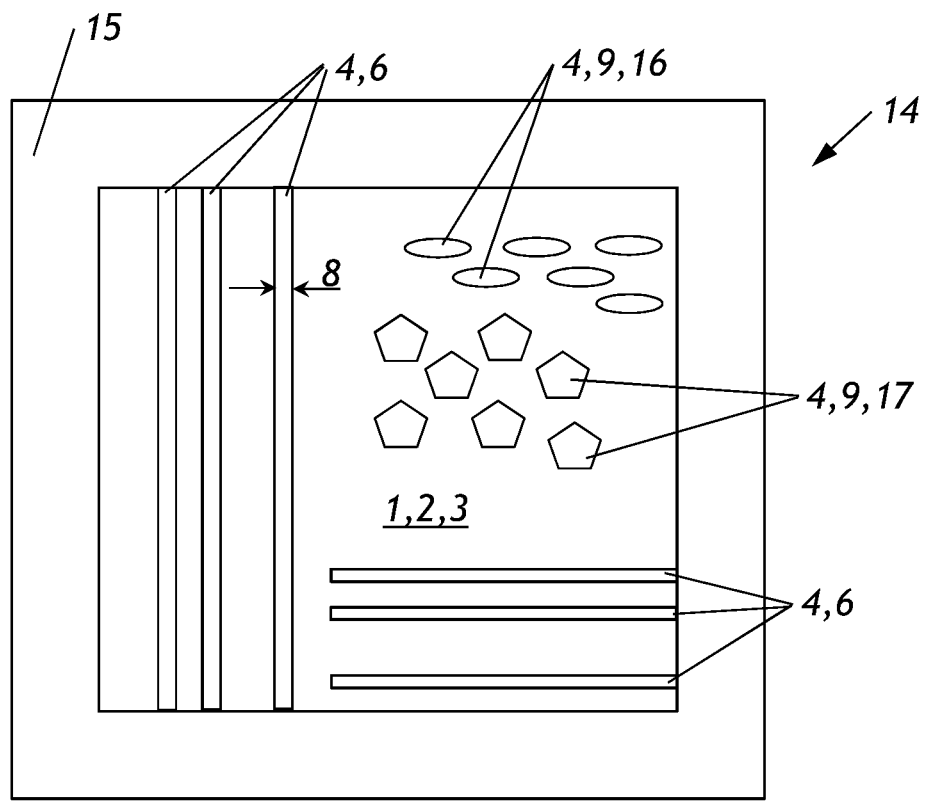
FIG. 1 shows an elevational view of a panel for a traffic route noise protection wall with a first embodiment of the sound absorber of the present invention.
Figure 2:
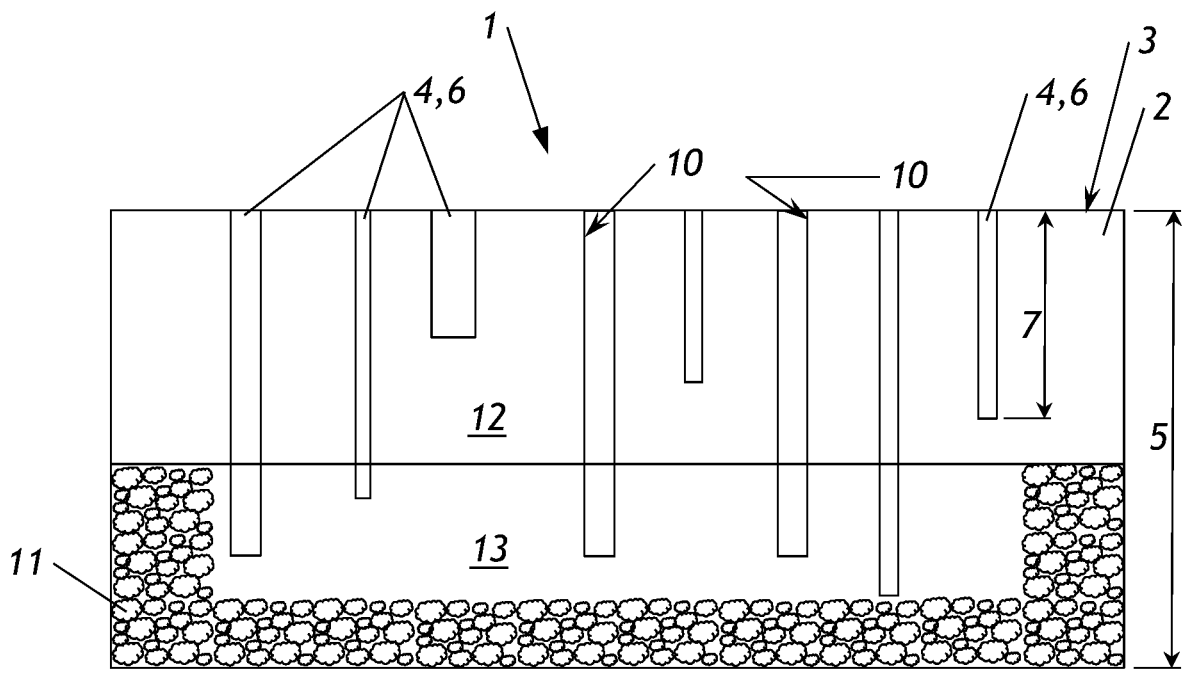
FIG. 2 shows a cross-sectional view of a second embodiment of the sound absorber according to the present invention.

FIGS. 1 and 2 each show a sound absorber 1 for a traffic route noise protection wall, the sound absorber 1 comprising at least one plastic foam board 2, wherein a first surface 3 of the plastic foam board 2 comprises a predeterminable number of sound absorber recesses 4 for predetermination of the absorption behavior with a predeterminable frequency response, wherein the sound absorber recesses 4 in each case extend over a part of a thickness 5 of the plastic foam board 2 only.

In this manner a weather-resistant sound absorber 1 can be formed which comprises a high sound absorption capacity provided by the sound absorber recesses or openings 4 in the surface 3. In this connection it has been found that the number as well as the specific dimensions and the shaping of the sound absorber recesses 4 determine both the degree of the sound absorption capacity and the frequency dependence or frequency response of the sound absorption capacity. By predetermination or adaption of the sound absorber recesses 4 the sound absorption capacity can be easily adapted to different requirements.

Sound absorbers 1 according to the present invention are intended for use in a noise protection wall, in particular a traffic route noise protection wall. The traffic route can be any kind of traffic route, in particular a traffic route for motor vehicles. In particular, the traffic route can be a road, railway track, runway, river or canal, etc. In addition, it can also be used for all other outdoor noise sources, such as an open air concert, a shooting range or a rocket launch site.

The sound absorber 1 of the present invention is preferably part of a panel 14, and as such is surrounded by a frame 15. Furthermore, the panel 14 preferably comprises a rear wall. However, the sound absorber 1 can also be used on its own, i.e. without any further support structure.

The sound absorber 1 comprises at least one plastic foam board 2. The plastic foam can be any type of plastic foam. Polyethylene foam boards turned out to be particularly preferred. On the other hand, plastic foam boards comprising polypropylene can also be provided.

The plastic foam board 2 comprises pores 11. Provision can be made for the majority of these pores 11 to be open-celled and/or closed-celled. In particular, provision can be made for the majority of the pores 11 to be closed. As a result, the plastic foam board 2 has an improved dimensional stability and weather-resistance than corresponding plastic foam boards 2 with opens cells or pores. It has been proven to be advantageous if the pores 11 have an average pore size that is greater than 2 mm.

In FIG. 2 some of these pores are shown in a schematic manner, wherein pores 11 are not shown over the entire cross-section area for reasons of clarity of the illustration.

Furthermore, plastic foam boards 2 with a Shore A hardness between 15 and 70 have proven to be particularly suitable. A hardness that is too low usually is accompanied by a low dimensional stability, whereas a hardness that is too high reduces the internal damping of the material.

Furthermore, it is preferably provided that the plastic foam board 2 has a density of between 15 and 50 kg/m$^3$.

The plastic foam board 2 includes a first surface 3 which is intended to be facing the sound or noise source during operation. The first surface 3 is preferably, as far as the pores 11 are concerned, closed and therefore has no or only a small number of open pores on the surface 3 itself. Of course, the first surface is opened up by the sound absorber recesses 4.

Provision is made for the first surface 3 to have a predetermined number of sound absorber recesses 4 for predetermining an absorption behavior and reflection behavior with a predetermined frequency response. The behavior at issue is the absorption behavior or reflection behavior for airborne sound. The absorption behavior can also be referred to as sound absorption behavior. Furthermore, the predetermination of the absorption behavior or the reflection behavior relates to the corresponding behavior of the entire sound absorber element 1, and not to the absorption behavior or reflection behavior of an individual sound absorption recess 4. It has been found that the absorption behavior or reflection behavior of the entire sound absorber 1 can be determined by the shape, depth 7, number and specific arrangement of the sound absorber recesses 4.

The degree of absorption must always be considered at specific frequencies since this degree of absorption or reflection by its very nature is not and cannot be constant over the entire relevant frequency range that can be perceived by humans. The frequency response or frequency behavior is therefore understood to be the degree of absorption as a function of frequency. In itself, this meaning of the term frequency response is clearly understood by a person skilled in the art.

It is essential that each of the sound absorber recesses 4 extends only over a part of a thickness 5 of the plastic foam board 2. The values of the depth 7 are therefore lower than the thickness 5 of the entire plastic foam board 2. In this manner it can be achieved that under no circumstances there is an open sound passage. Also in the case that a backing plate is placed behind the plastic foam board 2, for example a wood or metal plate, in this way sound insulation is improved because it is ensured that no sound impinges on a reverberant surface directly.

Besides the fact that the sound absorber recesses 4 do not completely penetrate the plastic foam board 2, in addition a minimum depth is also of relevance in order to achieve the desired effect. In this respect it has been found to be advantageous if the sound absorber recesses 4 have a depth 7 of at least 30%, in particular at least 50%, of the thickness 5 of the plastic foam board 2.

The pores 11 of the plastic foam board 2 have already been discussed. Preferably provision is made for a plurality of pores 11 to be open to each of the sound absorber recesses 4 and to be connected to the first surface 3. As a result, the sound to be reduced can penetrate into the inner structure of the plastic foam board, where it is refracted at the different structures, reflected, and thus damped.

The sound absorber recesses 4 can have different shapes and dimensions. Differently designed sound absorber recesses 4 may also be present on one and the same plastic foam board 2.

It is particularly preferred that the sound absorber recesses 4 are formed without undercuts. In this context, without undercuts means that the sound absorber recesses 4 are free of undercuts. A width 8 of the sound absorber recesses 4 is therefore preferably constant or getting narrower with increasing depth 7. There is no widening of an individual sound absorption recess 4 with increasing depth. In particular, the sound absorber recesses 4 are therefore no Helmholz resonators. This is advantageous in particular in view of production, since the sound absorber recesses 4 can simply be formed into the plastic foam board, for example by a sawing, drilling or melding device.

According to a first particularly preferred embodiment, a predeterminable number, in particular all, of the sound absorber recesses 4 are each in the form of a groove 6 having a predeterminable depth 7. This has advantageous in particular with regard to production, since such a groove 6 can easily be cut, for example by means of a sawing device. It is provided that the groove 6 has a finite width and, in contrast to a mere incision with a blade, in fact has two side walls 10 which are spaced apart from one another. Preferably, provision is made for the groove 6 to have a width 8 of at least 1 mm, in particular at least 2 mm, preferably at least 3 mm. It has been found that narrower grooves 6 have only a very small effect. In this connection it can preferably be provided that the width of the grooves is not greater than 20 mm.

The grooves 6 may extend over the entire length or width of a plastic foam board 2, or only over a part thereof. In FIG. 1 both variants are shown. The grooves 6 may also be arranged in a curved shape.

According to a second, particularly preferred embodiment it is provided that a predeterminable number, in particular all, of the sound absorber recesses 4 are each designed in the form of a blind hole 9 with a predeterminable depth 7. These blind holes 9 may have any cross-sectional shape, such as illustrated in FIG. 1 in which elliptic blind holes 9, 16 as well as pentagonal blind holes 9, 17 are shown. It is particularly preferred that the blind holes 9 have an annular shape, preferably a circular shape. The term annular also covers a so-called orbiform curve.

Provision is preferably made for the blind holes 9 to have a finite width or a corresponding diameter and, in contrast to a mere puncture with the needle, also actually forms an opening with side walls 10 which are spaced apart from one another. Preferably the blind holes 9 have an area of at least 0.7 mm$^2$, in particular of at least 2 mm$^2$. The reference to the area al- lows an accurate determination of sizes regardless of the shape.

The sound absorber recesses have side walls 10.

It is preferred that the side walls 10 are oriented substantially normal to the first surface 3, in particular over the entire depth 7. Side walls 10 are regarded as essentially normal if their orientation does not deviate from a normal orientation by more than 8°. In addition or alternatively it is preferred that the side walls 10 are essentially parallel.

Provision can furthermore be made for the side walls 10 to be arranged in V-shape and to widen towards the surface 3, in particular over the entire depth 7.

It is preferred that the grooves 6 have a rectangular cross-section. The cross-section may in particular be rectangular when viewed parallel to the surface 3 and/or normal to the surface 3.

Furthermore, the grooves 6 may also have cross-sections which deviate from rectangles and which may for example be formed by milling cutters. In this case bulbous or rounded cross-sections can be provided.

As already explained, it is particularly preferred that sound absorber recesses 4 of different designs are part of one and the same sound absorber 1. By combining different sound absorber recesses 4 a very specific or targeted absorption behavior can be set. Usually this is carried out by a test series or by computer simulation.

In addition to the width or shape and area of the sound absorber recesses 4 provision is made especially for varying the depth 7 of the sound absorber recesses 4. In this connection it has been found to be advantageous both with regard to the acoustic effect and also with regard to simple production if a first group of sound absorber recesses 4 has a first depth 7, and a second group of sound absorber recesses 4 has a second depth 7, and if the first depth 7 is different from the second depth 7. FIG. 2 shows grooves 6 of different depths 7.

With regard to a particularly simple manufacture it is particularly advantageous to arrange sound absorber recesses 4 of the first group and of the second group alternately along a predeterminable cross-section of the plastic foam board 2.

Besides variation of the depth 7, it is also be found to be particularly advantageous to vary distances between the sound absorber recesses 4. It is particularly preferred that a third group of sound absorber recesses 4 is arranged in a first distance to each other, that a fourth group of sound absorber recesses 4 is arranged in a second distance to each other, and that the first distance differs from the second distance.

FIG. 2 shows a plastic foam board 2 which is formed as a composite board comprising two individual plastic foam part boards 12, 13 wherein the sound absorber recesses 4 extend over at least two of the plastic foam part boards 12, 13. In this manner different acoustic properties of different plastic foams can be combined. Of course, more than two plastic foam part boards can be connected, in particular be clued together, to form a composite board.

In particular, it has proven to be very effective if the two plastic foam part boards 12, 13 differ from each other in terms of the pore size of the pores 11. It is therefore furthermore preferred that the first plastic foam part board 12 has a first pore size, that the second plastic foam part board 13 has a second pore size, and that the first pore size differs from the second pore size.

Because also the type of plastic that is used for making the plastic foam has a considerable influence, in particular on the internal damping of the plastic foam part boards 2, it is furthermore preferred that a third plastic foam part board is made of a first plastic, that a fourth plastic foam part board is made of a second plastic, and that the first plastic is different from the second plastic.

In the present disclosure features are usually introduced with an indefinite article "a, an". Unless something different follows from the context, this indefinite article is not intended to be a numeric indication, and the disclosure is not limited to a single presence of each feature.

Furthermore, an "or" is to be interpreted as inclusive and not as exclusive. In case of two generic terms "A" and "B", respectively, the wording "A or B" does not exclude the possibility "A and B", unless it follows from the context or the present description that only one of the two generic terms "A" and "B" is meant.

Furthermore, from the use of an ordering number, such as first, second, third, etc., which is prefixed to a feature it does not necessarily follow that there is a group of the feature in question.

The invention claimed is:

1. A sound absorber for a traffic route noise protection wall, the sound absorber comprising:
at least one plastic foam board having a given thickness and a first surface forming a surface of the sound absorber and defining sound absorber recesses in the form of a plurality of grooves extending across the first surface to provide a desired frequency response sound absorption capacity behavior for the foam board, wherein the sound absorber recesses extend only partially into the thickness of the plastic foam board.

2. The sound absorber according to claim 1, wherein each groove of the plurality of grooves has a width of at least 1 mm.

3. The sound absorber according to claim 1 wherein each groove of the plurality of grooves has a width of at least 2 mm.

4. The sound absorber according to claim 1 wherein the sound absorber recesses define side walls which are substantially normal to the first surface.

5. The sound absorber according to claim 1 wherein the sound absorber recesses extend to a depth of at least 30% of the thickness of the plastic foam board.

6. The sound absorber according to claim 1 wherein the sound absorber recesses comprise a first group of sound absorber recesses that extends for a first depth into the thickness of the plastic foam board and a second group of sound absorber recesses that extends for a second depth into the thickness of the plastic foam board, wherein the first depth is different from the second depth.

7. The sound absorber according to claim 6, wherein the sound absorber recesses of the first group and of the second group alternate across the surface of the plastic foam board.

8. The sound absorber according to claim 1 wherein the sound absorber recesses extend to a depth of at least 50% of the thickness of the plastic foam board.

9. The sound absorber according to claim 1 wherein the plastic foam board further defines pores, and a majority of the pores are closed.

10. The sound absorber according to claim 1 wherein the plastic foam board further defines pores, and a plurality of the pores are opened and connected to the first surface by each of the sound absorber recesses.

11. The sound absorber according to claim 9 wherein the pores have an average pore size greater than 2 mm.

12. The sound absorber according to claim 1 wherein the plastic foam board has a hardness between 15 Shore A and 70 Shore A.

13. The sound absorber according to claim 1 wherein the plastic foam board has a density between 15 kg/m3 and 50 kg/m3.

14. The sound absorber according to claim 1 wherein the at least one plastic foam board is formed as a composite board comprising a predeterminable number of individual plastic foam part boards and that the sound absorber recesses extend over at least two of the plastic foam part boards.

15. The sound absorber according to claim 14 wherein the composite board comprises a first plastic foam part board having a first average pore size and a second plastic foam part board having a second average pore size, wherein the first average pore size is different from the second average pore size.

16. The sound absorber according to claim 15 wherein:
the first plastic foam part board is formed from a first plastic;
the second plastic foam part board is formed from a second plastic; and
the first plastic is different from the second plastic.

17. A traffic route noise protection wall placed on a traffic route outdoors, the wall comprising the sound absorber of claim 1 and having the first surface facing the traffic route.

18. The noise protection wall according to claim 17 wherein the traffic route comprises a road or railway track.

19. The sound absorber according to claim 1 wherein:
each groove of the plurality of grooves defines:
opposing side walls having a width between the opposing side walls; and
a depth from the first surface to the bottom of the groove; and
the width remains constant or gets narrower with increasing depth from the first surface.

20. The sound absorber according to claim 1 wherein the plurality of grooves extends across the full extent of the first surface of the at least one plastic foam board.

* * * * *